(12) United States Patent
Kono et al.

(10) Patent No.: US 10,249,853 B2
(45) Date of Patent: Apr. 2, 2019

(54) POWER STORAGE DEVICE

(71) Applicant: KABUSHIKI KAISHA TOYOTA JIDOSHOKKI, Kariya-shi, Aichi-ken (JP)

(72) Inventors: Satoshi Kono, Kariya (JP); Hirokuni Akiyama, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/531,623

(22) PCT Filed: Nov. 13, 2015

(86) PCT No.: PCT/JP2015/082018
§ 371 (c)(1),
(2) Date: May 30, 2017

(87) PCT Pub. No.: WO2016/088535
PCT Pub. Date: Jun. 9, 2016

(65) Prior Publication Data
US 2017/0309873 A1  Oct. 26, 2017

(30) Foreign Application Priority Data

Dec. 3, 2014 (JP) .................. 2014-245362

(51) Int. Cl.
*H01M 2/10* (2006.01)
*H01G 11/26* (2013.01)
(Continued)

(52) U.S. Cl.
CPC .............. *H01M 2/10* (2013.01); *H01G 11/26* (2013.01); *H01G 11/28* (2013.01); *H01G 11/78* (2013.01);
(Continued)

(58) Field of Classification Search
CPC ...... H01M 2/10; H01M 4/133; H01M 10/052; H01M 10/0585
See application file for complete search history.

(56) References Cited

U.S. PATENT DOCUMENTS 6,309,428 B1   10/2001 Niiori et al.
2008/0220330 A1*  9/2008 Hosaka ............... H01M 4/0404
429/209
(Continued)

FOREIGN PATENT DOCUMENTS

DE   112011105960 T5   9/2014
JP       11339853 A  * 12/1999
(Continued)

OTHER PUBLICATIONS

Mindat, https://www.mindat.org/min-1740.html Obtained Jan. 11, 2018 (2012) (Year: 2012).*
(Continued)

*Primary Examiner* — Jimmy Vo
(74) *Attorney, Agent, or Firm* — Sughrue Mion, PLLC (57) ABSTRACT

An electricity storage device includes an electrode assembly and a load applying mechanism. The load applying mechanism applies, to the electrode assembly, a load in a direction in which the positive electrode and the negative electrode are stacked in the electrode assembly. The negative electrode includes a metal foil and an active material layer that covers at least part of the metal foil and contains a carbon-based material as an active material. The density of the carbon-based material in the active material layer is 1.2 g/cm³ or higher. The degree of orientation that is defined as a ratio (I(100)/I(002)) of an X-ray diffraction intensity I(100) of a (100) plane to a diffraction intensity I(002) of a (002) plane
(Continued)

in the active material layer is lower than or equal to 0.3. The load applied by the load applying mechanism is greater than or equal to 0.22 MPa.

9 Claims, 5 Drawing Sheets

(51) Int. Cl.
| | | |
|---|---|---|
| *H01G 11/28* | (2013.01) | |
| *H01G 11/78* | (2013.01) | |
| *H01M 4/133* | (2010.01) | |
| *H01M 10/052* | (2010.01) | |
| *H01M 10/0585* | (2010.01) | |
| *H01M 4/587* | (2010.01) | |
| *H01M 10/04* | (2006.01) | |
| *H01M 4/02* | (2006.01) | |

(52) U.S. Cl.
CPC ........... *H01M 4/133* (2013.01); *H01M 4/587* (2013.01); *H01M 10/0468* (2013.01); *H01M 10/052* (2013.01); *H01M 10/0585* (2013.01); *H01M 2/1077* (2013.01); *H01M 2004/021* (2013.01); *H01M 2220/20* (2013.01); *Y02E 60/122* (2013.01); *Y02T 10/7011* (2013.01)

(56) References Cited

U.S. PATENT DOCUMENTS

| | | |
|---|---|---|
| 2012/0135312 A1 | 5/2012 | Takahashi |
| 2012/0183887 A1 | 7/2012 | Iseki et al. |
| 2012/0308870 A1 | 12/2012 | Okuda et al. |
| 2015/0030931 A1 | 1/2015 | Takahata et al. |

FOREIGN PATENT DOCUMENTS

| | | |
|---|---|---|
| JP | 2000-223376 A | 8/2000 |
| JP | 2005-209394 A | 8/2005 |
| JP | 2011148686 A | 8/2011 |
| JP | 2013-4307 A | 1/2013 |
| JP | 2014-160615 A | 9/2014 |
| WO | 2011/102054 A1 | 8/2011 |
| WO | 2012/001844 A1 | 1/2012 |

OTHER PUBLICATIONS

International Preliminary Report on Patentability dated Jun. 6, 2017 in application No. PCT/JP2015/082018.
Communication dated Feb. 22, 2018, issued by the German Patent Office in counterpart German Application No. 112015005478.2.

* cited by examiner

POWER STORAGE DEVICE

CROSS REFERENCE TO RELATED APPLICATIONS

This application is a National Stage of International Application No. PCT/JP2015/082018 filed Nov. 13, 2015, claiming priority based on Japanese Patent Application No. 2014-245362 filed Dec. 3, 2014, the contents of all of which are incorporated herein by reference in their entirety.

TECHNICAL FIELD

The present invention relates to an electricity storage device.

BACKGROUND ART

Conventionally, vehicles such as electric vehicles (EV) and plug-in hybrid vehicles (PHV) are equipped with electricity storage devices such as lithium ion rechargeable batteries that store electricity to be supplied to motors. As described in, for example, Patent Document 1, such an electricity storage device has electrode assemblies, each of which has positive electrodes and negative electrodes stacked and layered while being insulated from each other.

In Patent Document 1, the negative electrodes each include a metal foil and an active material layer covering the surface of the metal foil, and the active material layer of the negative electrode contains carbon-based material as active material. Patent Document 1 specifies the density and the surface roughness of the carbon-based material to limit expansion of the active material layer of the negative electrode due to charging and discharging.

PRIOR ART DOCUMENT

Patent Document

Patent Document 1: International Publication No. 2012/001844

SUMMARY OF THE INVENTION

Problems that the Invention is to Solve

It is considered that expansion of active material layers can also be limited by applying load to electrode assemblies. For this reason, expansion of active material layers is desired to be limited, while taking into account application of load to electrode assemblies.

It is an objective of the present invention to provide an electricity storage device capable of limiting expansion of active material layers.

Means for Solving the Problems

To achieve the foregoing objective and in accordance with one aspect of the present invention, an electricity storage device that includes an electrode assembly and a load applying mechanism is provided. In the electrode assembly, a positive electrode and a negative electrode are stacked and layered while being insulated from each other. The load applying mechanism applies, to the electrode assembly, a load in a direction in which the positive electrode and the negative electrode are stacked in the electrode assembly. The negative electrode includes a metal foil and an active material layer that covers at least part of the metal foil and contains a carbon-based material as an active material. A density of the carbon-based material in the active material layer is 1.2 g/cm$^3$ or higher. A degree of orientation that is defined as a ratio (I(100)/I(002)) of an X-ray diffraction intensity I(100) of a (100) plane to a diffraction intensity I(002) of a (002) plane in the active material layer is lower than or equal to 0.3. The load applied by the load applying mechanism is greater than or equal to 0.2 MPa.

In general, carbon-based materials, which are used as active materials, have a crystal structure similar to that of graphite at least in part. In such a crystal structure, delamination occurs due to insertion and desorption of lithium into and from between layers. This may expand negative electrode active material layers. With the above-described configuration, the density of the carbon-based material is 1.2 g/cm$^3$ or higher and the degree of orientation is 0.3 or lower. This aligns the direction in which the positive electrodes and the negative electrodes are stacked with the direction in which the carbon-based material expands and contracts. Application of a load of 0.2 MPa or greater to the electrode assembly in the direction in which the positive electrodes and the negative electrodes are stacked limit delamination, thereby limiting expansion of the active material layers of the negative electrodes.

In the above described electricity storage device, the load applied by the load applying mechanism is preferably greater than or equal to 0.22 MPa. This configuration limits delamination and limits expansion of the active material layers of the negative electrodes as compared with a case where the load applied to the electrode assembly in the direction in which the positive electrodes and the negative electrodes are stacked is 0.2 MPa or greater.

In the above described electricity storage device, the electrode assembly preferably has a lamination structure in which the positive electrode and the negative electrode are alternately laminated, and the load applying mechanism preferably includes a load application surface at which the load applying mechanism applies the load to the electrode assembly. This configuration applies a load to the electrode assembly at the load application surface and thus enlarges the area in which expansion of the active material layers is limited.

In the above described electricity storage device, the electrode assembly preferably includes a porous separator that is arranged between the positive electrode and the negative electrode and insulates the positive electrode and the negative electrode from each other, and the load applied by the load applying mechanism is preferably smaller than or equal to 4 MPa. This configuration prevents the function of the separator from being impaired by the load, while limiting expansion of the active material layers.

The above described electricity storage device preferably includes a case that accommodates the electrode assembly, and the load applying mechanism is preferably configured to apply the load from outside the case. In this configuration, the load applying mechanism is provided outside the case to apply the load from the outside of the case. This facilitates maintenance on the load applying mechanism.

In the above described electricity storage device, the load applying mechanism preferably includes a pair of restraint plates. The restraint plates are preferably arranged at opposite ends of a plurality of unit electricity storage portions in a direction in which the positive electrode and the negative electrode of the case are stacked. A plate-shaped elastic member is preferably arranged at least at one of a position between one of the unit electricity storage portions and one of the restraint plates and a position between an adjacent pair of the unit electricity storage portions. The term "elastic member" is not limited to a material that exhibits elasticity even when it is formed as a solid body as a whole like rubber, but also includes a material that exhibits elasticity in a porous state like a foamed plastic. This configuration limits reduction in the battery performance (capacity maintenance ratio) as compared with a case where the load applying mechanism applies load to the walls of the case via a pair of restraint plates without elastic members in between.

The above described electricity storage device preferably a case that accommodates the electrode assembly. The load applying mechanism is preferably a thickness adjuster provided in the case of a unit electricity storage portion, and the thickness adjuster is preferably arranged between the electrode assembly and a wall of the case in a direction in which the positive electrode and the negative electrode of the case are stacked. The thickness adjuster is made of an elastic member such as rubber or foamed plastic, for example. With this configuration, when expanding, the electrode assembly is pressed against a wall of the case via the thickness adjuster arranged between the wall and the outer surface of the electrode assembly. The electrode assembly is thus restrained from receiving excessive force.

In the above described electricity storage device, the electrode assembly is preferably one of a plurality of electrode assemblies. The electricity storage device preferably includes a plurality of unit electricity storage portions each including a case and one of the electrode assemblies, and the case accommodates the electrode assembly. The unit electricity storage portions preferably are arranged in a row in the stacking direction, and the load applying mechanism preferably applies the load from opposite ends of the unit electricity storage portions in the stacking direction.

In the above described electricity storage device, the carbon-based material is preferably graphite.

Effects of the Invention

The present invention limits expansion of the active material layer.

MODES FOR CARRYING OUT THE INVENTION

First Embodiment

A rechargeable battery module according to one embodiment will now be described.

Figure 1:
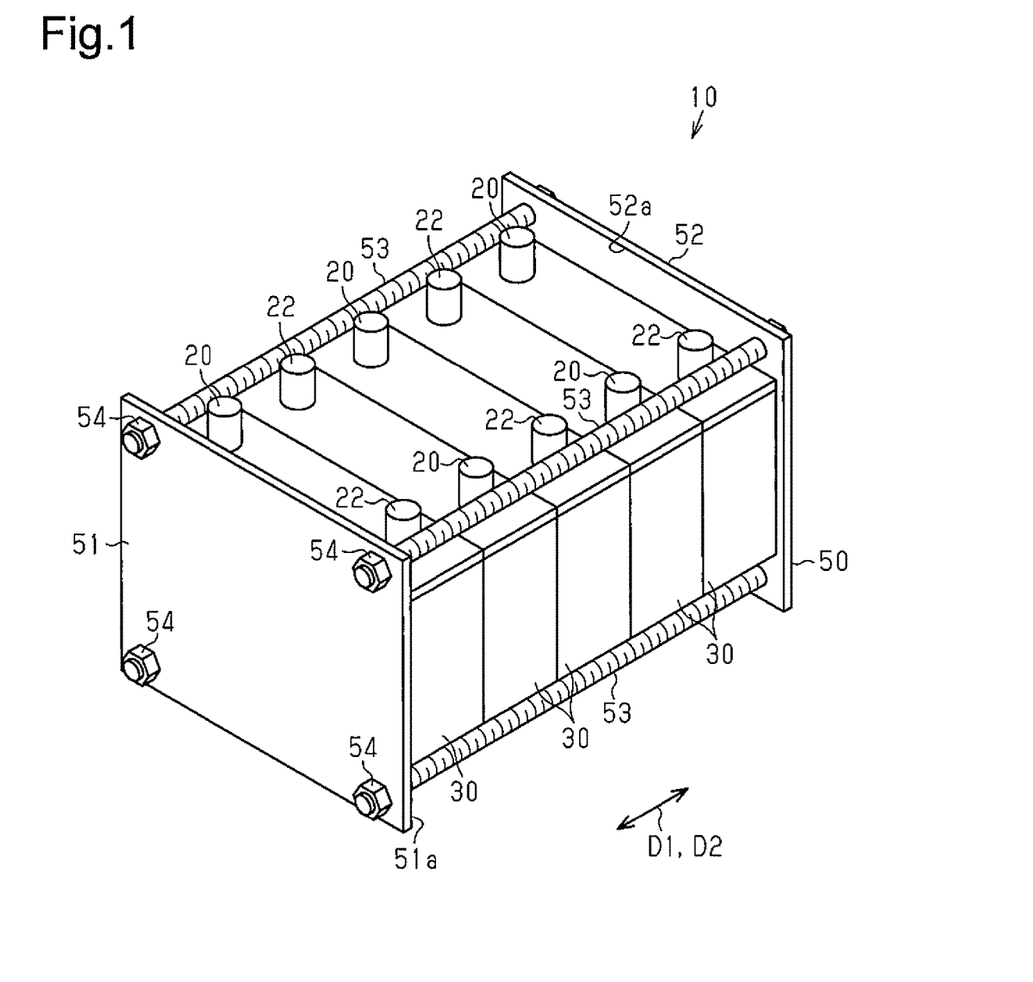
FIG. 1 is a perspective view schematically showing a rechargeable battery module according to a first embodiment.

As shown in FIG. 1, a rechargeable battery module 10, which is an electricity storage device, includes one or more rechargeable battery cells 30, which are unit electricity storage portions, and a load applying mechanism 50 for applying a load from the opposite ends of the rechargeable battery cells 30. FIG. 1 illustrates a rechargeable battery module 10 having a plurality of rechargeable battery cells 30. In the following description, in a case where a plurality of rechargeable battery cells 30 are provided, the direction in which the rechargeable battery cells 30 are arranged will simply be referred to as an arrangement direction D1.

First, the rechargeable battery cell 30 will be described.

Figure 2:
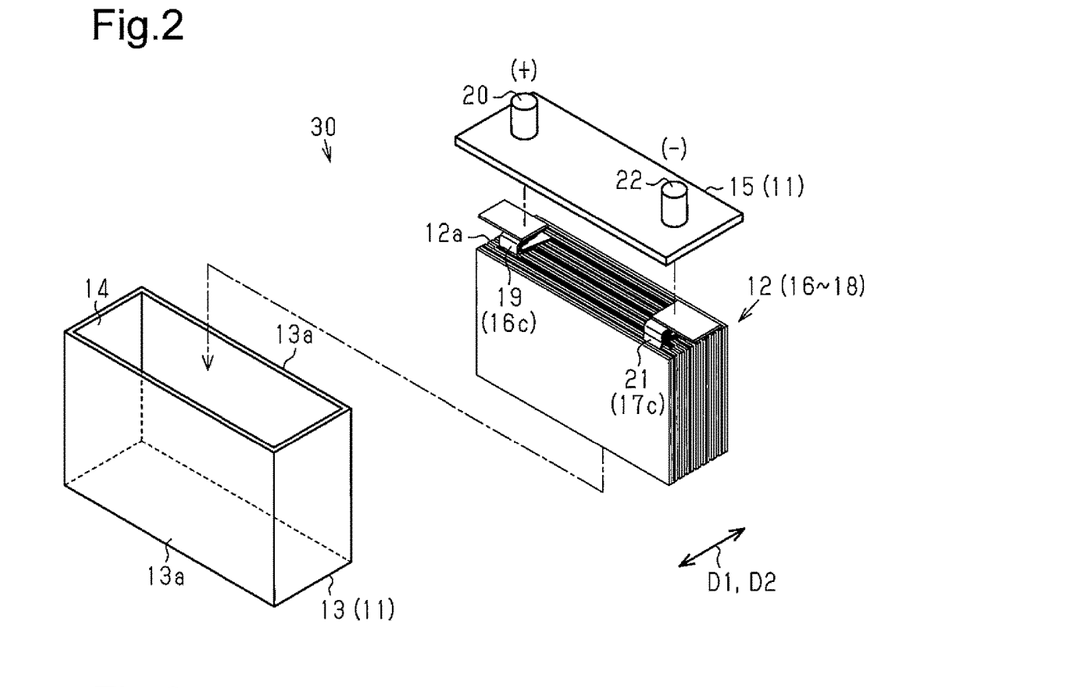
FIG. 2 is an exploded perspective view of a rechargeable battery cell.

As shown in FIG. 2, the rechargeable battery cell 30 is a lithium ion rechargeable battery having a rectangular appearance. The rechargeable battery cell 30 includes a case 11 and an electrode assembly 12 accommodated in the case 11. The case 11 includes a case body 13 and a rectangular plate-shaped lid 15. The case body 13 is shaped as a rectangular tube with an opening 14 and a closed end, and the lid 15 closes the opening 14 of the case body 13. The case body 13 and the lid 15 are made of metal, such as stainless steel or aluminum. The thickness of the walls of the case body 13 is set such that the walls are elastically deformable. The case 11 contains electrolytic solution, which is an electrolyte (not shown).

Figure 3:
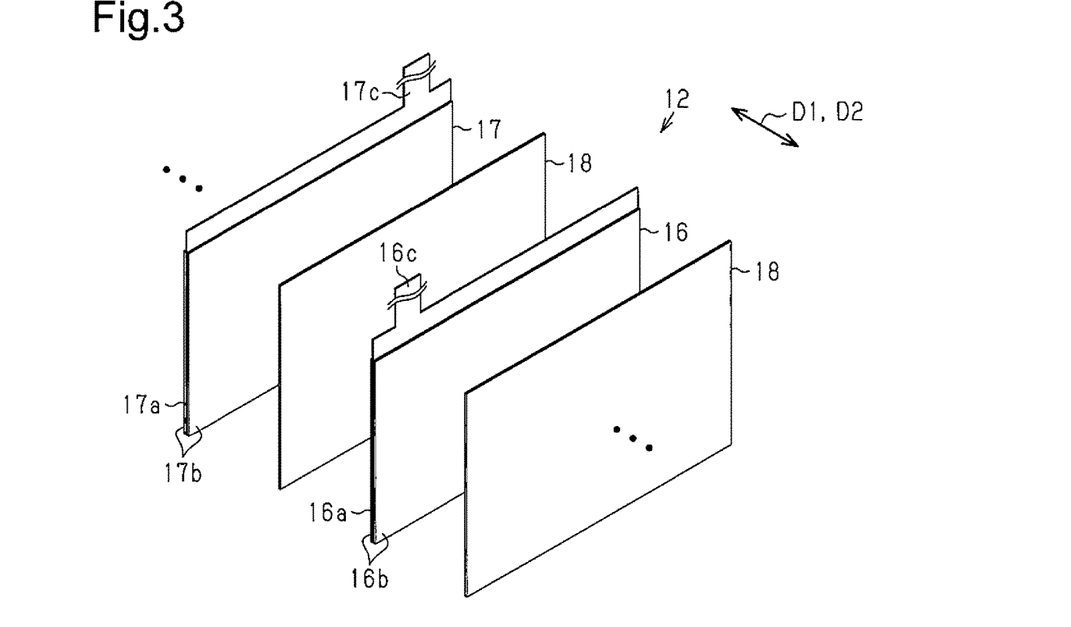
FIG. 3 is an exploded perspective view of the electrode assembly.

As shown in FIG. 3, the electrode assembly 12 includes positive electrodes 16 and negative electrodes 17, which are stacked and layered while being insulated from each other. That is, the electrode assembly 12 has a lamination structure in which the positive electrodes 16 and the negative electrodes 17 are alternately laminated. In the following description, the direction in which the positive electrodes 16 and the negative electrodes 17 are stacked will simply be referred to as a lamination direction D2.

The electrode assembly 12 further includes porous separators 18, each of which is arranged between a positive electrode 16 and a negative electrode 17, and insulates the positive electrode 16 and the negative electrode 17 from each other. The separators 18 are made of a plastic material such as polypropylene or polyethylene, for example, and have a fine pore structure so that lithium (lithium ions) can pass through during charging and discharging.

Each positive electrode 16 has a positive electrode metal foil 16a, a positive electrode active material layer 16b covering the positive electrode metal foil 16a, and a positive electrode collector tab 16c protruding from an edge in a plane direction of the positive electrode metal foil 16a. The positive electrode metal foil 16a is, for example, an aluminum foil or an aluminum alloy foil. The positive electrode active material layer 16b contains an active material for positive electrodes, a binder, and a conductive aid. The active material for positive electrodes is, for example, $LiCoO_2$, $LiNiO_2$, $LiMn_2O_4$, $LiFePO_4$, $LiCo_{1/3}Ni_{1/3}Mn_{1/3}O_2$, or the like. The binder for positive electrodes is, for example, polyvinylidene fluoride, polytetrafluoroethylene, styrene-butadiene rubber, or the like. For the binder for positive electrodes, one type may be used, or two or more types may be used in combination. The conductive aid for positive electrodes is, for example, acetylene black, Ketjen black, flake graphite, or the like.

Each negative electrode 17 has a negative electrode metal foil 17a, a negative electrode active material layer 17b covering the negative electrode metal foil 17a, and a negative electrode collector tab 17c protruding from an edge in a plane direction of the negative electrode metal foil 17a. The negative electrode metal foil 17a is, for example, a copper foil or a copper alloy foil. The negative electrode active material layer 17b contains an active material for negative electrodes, a binder, and a conductive aid.

In the present embodiment, the active material for negative electrodes is a carbon-based material capable of storing and desorbing lithium (lithium ions). The carbon-based material is, for example, graphite (natural graphite, artificial graphite), cokes, graphites, glassy carbons, organic polymer compound-burned bodies, carbon fibers, active carbon, and carbon blacks. Particularly, graphite is preferable. The binder for negative electrodes is, for example, polyvinylidene fluoride, polytetrafluoroethylene, styrene-butadiene rubber, or the like. For the binder for negative electrodes, one type may be used, or two or more types may be used in combination. The conductive aid for negative electrodes is, for example, acetylene black, Ketjen black, or the like.

The density (packing density) of the carbon-based material in the negative electrode active material layer is 1.2 g/cm$^3$ or higher. The density of the carbon-based material in the negative electrode active material layer is preferably 1.2 g/cm$^3$ to 1.7 g/cm$^3$, and more preferably 1.3 g/cm$^3$ to 1.6 g/cm$^3$. When the density of the active material in the negative electrode active material layer exceeds 1.7 g/cm$^3$, the density is excessively high and particles of the active material are brought into contact with each other and easily damaged. Therefore, by lowering the density of the active material in the negative electrode active material layer to 1.7 g/cm$^3$ or lower, it is possible to limit reduction in the battery performance (capacity maintenance ratio). Further, by setting the density of the active material in the negative electrode active material layer to a value between 1.3 g/cm$^3$ and 1.6 g/cm$^3$, inclusive, it is possible to restrain contact between particles of the active material while increasing the density of the active material to achieve a higher battery performance (capacity maintenance ratio).

Further, the ratio (I(100)/I(002)) of the X-ray diffraction intensity I(100) of the (100) plane to the diffraction intensity I(002) of the (002) plane in the negative electrode active material layer is lower than or equal to 0.3, more preferably lower than or equal to 0.07.

Figure 4:
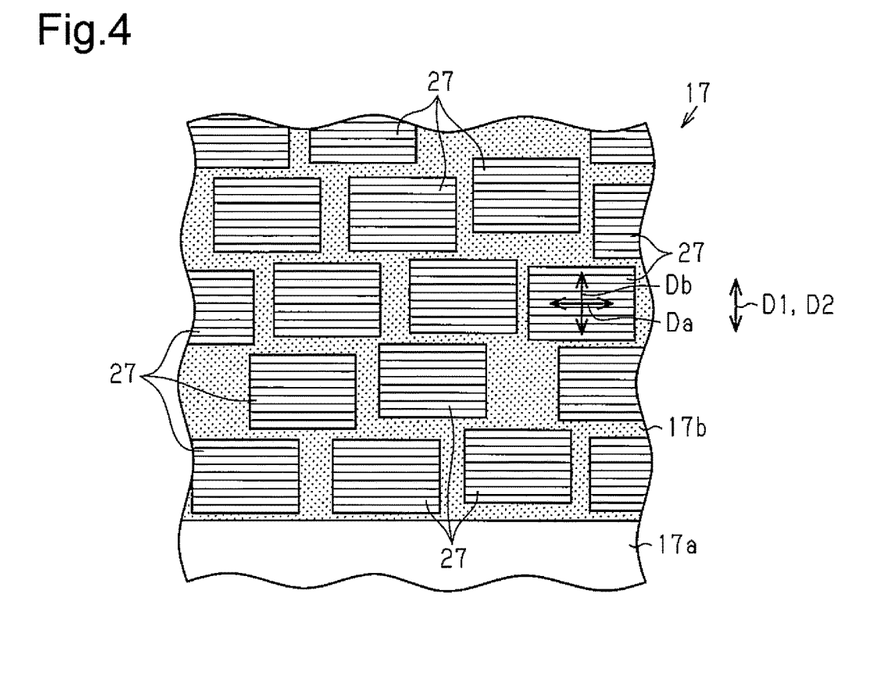
FIG. 4 is an explanatory diagram schematically showing the orientations of active material particles in a negative electrode active material layer.

As a result, as shown in FIG. 4, in the negative electrode active material layer 17b, active material particles 27 of carbon-based material have the same crystal structure as that of graphite at least in part. This increases the proportion of the active material particles 27 of which the in-layer direction Da of the graphite crystal structure is oriented along the plane direction of the negative electrode metal foil 17a. In other words, in the negative electrode active material layer 17b, the configuration increases the proportion of the active material particles 27 that are oriented such that the interlayer direction Db in the crystal structure of graphite is aligned with the direction orthogonal to the plane of the negative electrode metal foil 17a, that is, with the lamination direction D2. It can be said that as the degree of orientation decreases, the interlayer direction Db is more likely to be oriented along the lamination direction D2.

In the crystal structure of graphite, expansion and contraction tend to occur along the interlayer direction Db due to insertion and desorption of lithium into and from between layers during charging and discharging, and interlayer direction Db is the direction of expansion and contraction accompanying charging and discharging. That is, in the negative electrode active material layer 17b, each active material particle 27 is oriented such that the expansion and contraction direction of the active material particle 27 is aligned with the lamination direction D2.

In the crystal structure of graphite, delamination is likely to occur with expansion and contraction, and the delamination is likely to cause constant expansion of the negative electrode active material layer 17b (so-called misalignment of the active material particles 27). For purposes of illustration, the active material particles 27 are depicted in a simplified manner in FIG. 4. However, the active material particles 27 are not necessarily uniformly oriented, and do not necessarily have uniform shapes or sizes.

As shown in FIG. 2, the electrode assembly 12 has a positive electrode collector tab bundle 19, which protrudes from a surface 12a facing the lid 15 and is formed by stacking and layering the positive electrode collector tabs 16c. A positive terminal 20 for exchanging electricity with the electrode assembly 12 is connected to the positive electrode collector tab bundle 19. The positive terminal 20 is fixed to the lid 15 and protrudes to the outside of the case 11. The electrode assembly 12 also includes a negative electrode collector tab bundle 21, which protrudes from the facing surface 12a and is formed by stacking and layering the negative electrode collector tabs 17c. A negative terminal 22 for exchanging electricity with the electrode assembly 12 is connected to the negative electrode collector tab bundle 21. The negative terminal 22 is fixed to the lid 15 and protrudes to the outside of the case 11.

Further, the dimension (thickness) of the electrode assembly 12 along the lamination direction D2 is the same or substantially the same as the distance between the inner surfaces of two walls 13a opposed to each other in the lamination direction D2 of the case 11. For example, an insulating film or a thickness adjuster may be arranged between a wall of the case 11 and the electrode assembly 12. Therefore, in the rechargeable battery cell 30, it is possible to apply a load to the electrode assembly 12 in the lamination direction D2 by applying a load to each wall 13a in the lamination direction D2.

FIG. 1 illustrates a case where the rechargeable battery module 10 includes a plurality of rechargeable battery cells 30. The rechargeable battery cells 30 are arranged in a row such that the lamination directions D2 of the electrode assemblies 12 of the rechargeable battery cells 30 are aligned. That is, in the rechargeable battery module 10 that includes a plurality of rechargeable battery cells 30, the direction in which the rechargeable battery cells 30 are arranged in a row (the arrangement direction D1) and the direction in which the positive electrodes 16 and the negative electrodes 17 are stacked in the electrode assembly 12 of each rechargeable battery cell 30 (the lamination direction D2) are aligned.

The load applying mechanism 50 will now be described.

The load applying mechanism 50 has a first restraint plate 51 and a second restraint plate 52, which are a pair of restraint plates arranged at the opposite ends in the lamination direction D2. The first restraint plate 51 is arranged at a first end in the lamination direction D2 and has a load application surface 51a that applies a load by making surface contact with the case 11 of the rechargeable battery cell 30. The second restraint plate 52 is arranged at a second end opposite to the first end in the lamination direction D2 and has a load application surface 52a that applies a load by making surface contact with the case 11 of the rechargeable battery cell 30.

In a case where the rechargeable battery module 10 includes a single rechargeable battery cell 30, the load application surfaces 51a, 52a each come into contact with the single rechargeable battery cell 30. In the case where the rechargeable battery module 10 includes a plurality of rechargeable battery cells 30, the load application surface 51a of the first restraint plate 51 contacts the rechargeable battery cell 30 arranged at the first end, and the load application surface 52a of the second restraint plate 52 contacts the rechargeable battery cell 30 arranged at the second end.

Through-bolts 53 are respectively inserted through the four corners of the restraint plates 51, 52, and nuts 54 are threaded to the respective through-bolts 53. This restrains all the rechargeable battery cells 30 of the rechargeable battery module 10, so that the rechargeable battery cells 30 are held and integrated in the lamination direction D2. Since all the rechargeable battery cells 30 of the rechargeable battery module 10 are held by the restraint plates 51, 52, all the rechargeable battery cells 30 receive a predetermined load. That is, the load applying mechanism 50 is configured to apply a load to the electrode assemblies 12 from outside of the cases 11.

The load applied by the load applying mechanism 50 is 0.20 MPa or greater, preferably 0.22 MPa or greater, and more preferably 0.25 MPa or greater. Further, the load applied by the load applying mechanism 50 is, for example, 4 MPa or smaller. By setting the load applied by the load applying mechanism 50 to 4 MPa or smaller, it is possible to limit blockage of the pores of the separators 18. The load applied to the rechargeable battery cells 30 by the load applying mechanism 50 can be changed by adjusting the degree of threading of the nuts 54.

As described above, in each rechargeable battery cell 30, the lamination direction D2 is aligned with the expansion and contraction direction of the active material particles 27 in the negative electrode active material layer 17b of the negative electrode 17. That is, in the rechargeable battery module 10, application of a load to the rechargeable battery cells 30 (the electrode assemblies 12) from the lamination direction D2 applies a load to the negative electrode active material layers 17b from the direction of expansion and contraction of the active material particles 27 contained in the negative electrode active material layers 17b. Therefore, it is possible to efficiently limit misalignment of the active material particles 27 due to charging and discharging without excessively increasing the load applied by the load applying mechanism 50.

The present embodiment achieves the following advantages.

(1) In the present embodiment, the density of the carbon-based material is 1.2 g/cm$^3$ or higher and the degree of orientation is 0.3 or lower. This aligns the lamination direction D2 with the expansion and contraction direction of the active material particles 27. Also, application of a load of 0.20 MPa or greater, preferably 0.22 MPa or greater in the lamination direction D2 to each electrode assembly 12 limits delamination, and limits expansion of the negative electrode active material layer 17b of each negative electrode 17.

(2) Since a load can be applied to the electrode assemblies 12 at the load application surfaces 51a, 52a, the area in which expansion of the negative electrode active material layer 17b is limited can be increased.

(3) Since the load applied by the load applying mechanism 50 is set to 4 MPa or smaller, it is possible to prevent the function of the separators 18 from being impaired, while limiting expansion of the negative electrode active material layers 17b.

(4) Since the load is applied from outside of the cases 11, the load applying mechanism 50 can be provided outside the cases 11. This facilitates the maintenance of the load applying mechanism 50.

(5) Misalignment of the active material particles in the negative electrode active material layer is limited to limit reduction in the capacity maintenance ratio due to repetitive charging and discharging. That is, the life of the rechargeable battery module 10 is restrained from being shortened.

Second Embodiment

A rechargeable battery module according to a second embodiment will now be described. This embodiment is different from the first embodiment in the configuration of the load applying mechanism, and other configurations are similar, so detailed descriptions of similar parts will be omitted.

Figure 6:
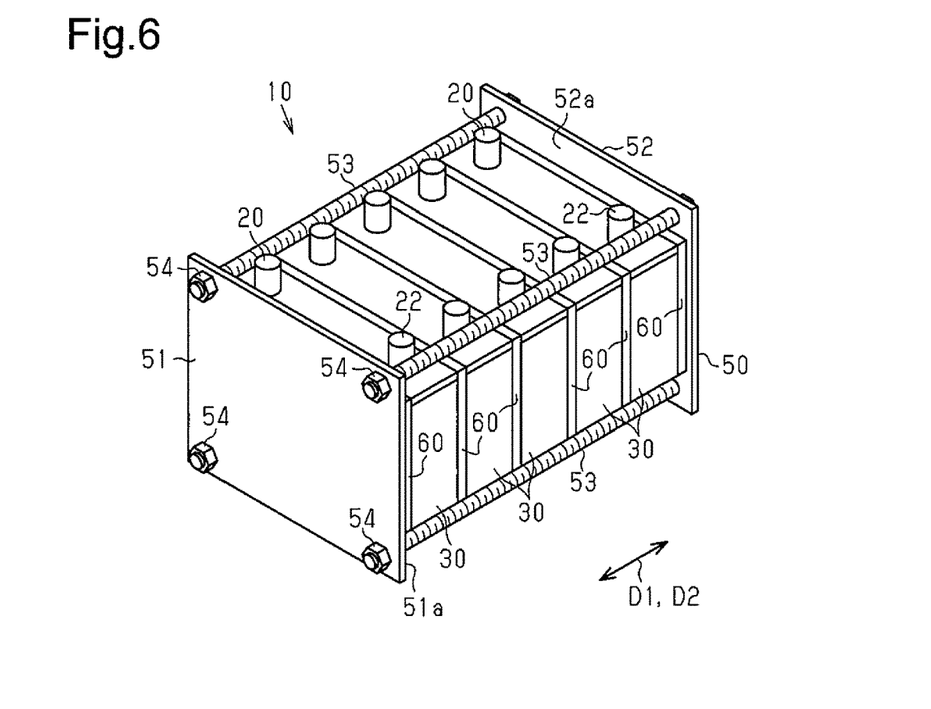
FIG. 6 is a perspective view schematically showing a rechargeable battery module according to a second embodiment.

As shown in FIG. 6, the rechargeable battery cells 30, which are unit electricity storage portions, are arranged in the arrangement direction D1. The load applying mechanism 50 includes plate-shaped elastic members 60. The elastic members 60 are respectively arranged between the rechargeable battery cell 30 at the first end and the first restraint plate 51, between the rechargeable battery cell 30 at the second end and the second restraint plate 52, and between each adjacent pair of the rechargeable battery cells 30.

The case 11 of each rechargeable battery cell 30 includes a case body 13. The walls of the case body 13 include walls 13a opposed to each other in the arrangement direction D1. The elastic members 60 are formed to cover the entire surface of the opposed walls 13a and the end faces of the lids 15. The elastic members 60 are made of elastic rubber.

In the present embodiment, the rechargeable battery cells 30 do not directly contact the first restraint plate 51, the second restraint plate 52, or the adjacent rechargeable battery cells 30, and the elastic members 60 are arranged in between. Therefore, when a load is applied by the load applying mechanism 50, a uniform force is easily applied to the walls 13a of the case bodies 13. That is, a load is uniformly applied to the electrode assemblies 12 in the lamination direction D2. This prevents the retained amount of electrolytic solution on the electrode surfaces from being uneven and thus prolongs the life of the rechargeable battery cells 30. As compared with the case where the magnitude of the load applied to the rechargeable battery cells 30 by the load applying mechanism 50 is adjusted only by the degree of threading of the nuts 54 to the through-bolts 53, the use of the elastic members 60 facilitates adjustment of the magnitude of the load to an intended value.

Therefore, the rechargeable battery module 10 of the present embodiment basically achieves the following advantage in addition to the same advantages as items (1) to (5) of the first embodiment.

(6) The rechargeable battery cells 30, which are unit electricity storage portions, are arranged in the arrangement direction D1. The load applying mechanism 50 includes plate-shaped elastic members 60. The elastic members 60 are respectively arranged between the rechargeable battery cell 30 at the first end and the first restraint plate 51, between the rechargeable battery cell 30 at the second end and the second restraint plate 52, and between each adjacent pair of the rechargeable battery cells 30. Therefore, as compared with a case in which the elastic members 60 are not used, unevenness in the retained amount of electrolytic solution in the rechargeable battery cells 30 is limited. This prolongs the life of the rechargeable battery cells 30.

The present invention is not limited to the above described embodiments, but may be modified as follows.

The rechargeable battery module 10 may include two or more rows of one or more rechargeable battery cells 30.

Figure 7:
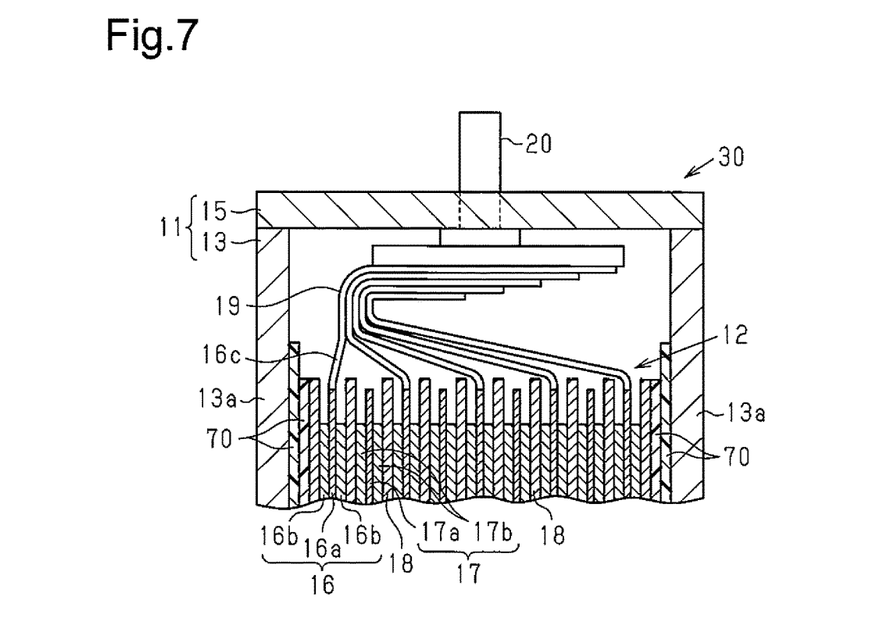
FIG. 7 is a partial cross-sectional view of a rechargeable battery cell provided with a load applying mechanism of another configuration.

The rechargeable battery module 10 may include a load applying mechanism 50 inside the case 11 of each rechargeable battery cell 30. In this case, a plurality of electrode assemblies 12 may be arranged along the lamination direction D2 in a single case. The load applied to the electrode assemblies 12 may be adjusted by thickness adjusters 70 arranged between the electrode assemblies 12 and the walls 13a of the case body 13, as shown in FIG. 7. In this case, the thickness adjusters 70 correspond to the load applying mechanism 50.

The thickness adjusters 70 are formed to have a predetermined thickness with an elastic material such as rubber or foamed plastic. In accordance with the distance between the electrode assemblies 12 and the wall 13a of the case body 13, one or more thickness adjusters 70 are provided. In the case of providing a plurality of thickness adjusters 70, the thickness adjuster 70 may be provided separately on the opposite sides of the electrode assembly 12 or only on one side of the electrode assembly 12.

The load applying mechanism 50 may be configured to apply a load by using an actuator.

The rechargeable battery cells 30 are arranged in the arrangement direction D1. The load applying mechanism 50 may be configured such that an elastic member 60 is arranged at least between the rechargeable battery cell 30 at the first end and the first restraint plate 51, between the rechargeable battery cell 30 at the second end and the second restraint plate 52, or between each adjacent pair of the rechargeable battery cells 30. For example, an elastic member 60 may be arranged only between the rechargeable battery cell 30 at the first end and the first restraint plate 51 and between the rechargeable battery cell 30 at the second end and the second restraint plate 52. Alternatively, an elastic member 60 may be arranged only between each adjacent pair of the rechargeable battery cells 30. However, the load applying mechanism 50 effectively suppresses unevenness in the retained amount of electrolytic solution in the rechargeable battery cells 30 and prolongs the life if an elastic member 60 is arranged between the rechargeable battery cell 30 at the first end and the first restraint plate 51, between the rechargeable battery cell 30 at the second end and the second restraint plate 52, and between each adjacent pair of the rechargeable battery cells 30.

Each electrode assembly 12 may be a spiral type in which a belt-like positive electrode and a belt-like negative electrode are wound together with a belt-like separator in between. In this case, the electrode assembly 12 is preferably formed to have flat surfaces facing the walls 13a of the case 11.

The case 11 constituting the rechargeable battery cell 30 does not necessarily need to be rectangular, but may have any shape as long as that shape can apply a load in the lamination direction D2 of the electrode assembly 12.

The rechargeable battery module 10 may be mounted on a vehicle such as a passenger car or an industrial vehicle or may be employed as a stationary electricity storage device.

The present invention is not limited to the rechargeable battery module 10 but may be embodied as an electricity storage module having a plurality of capacitors such as electric double-layer capacitors or lithium ion capacitors.

EXAMPLES

Examples of the above described embodiments will now be described.

<Preparation of Samples>

Sample 1

[Preparation of Positive Electrodes]

An active material paste was obtained by suspending, in N-methyl-2-pyrrolidone (NMP), $LiNi_{0.5}Co_{0.2}Mn_{0.3}O_2$ (D50=6 μm, specific surface area=0.5 $m^2$/g, tap density=2.2 g/$cm^3$) as an active material for positive electrodes, flake graphite as a conductive aid, and polyvinylidene difluoride as a binder. D50 denotes the median diameter. Subsequently, the active material paste was applied to an aluminum foil having a thickness of 15 μm and dried. The aluminum foil was then cut into a sheet to obtain a positive electrode having a basis weight of the active material layer=18.3 mg/$cm^2$, and a density of active material in the positive electrode active material=3.13 g/$cm^3$.

[Preparation of Negative Electrodes]

Graphite (D50=20 μm, specific surface area=3.7 $m^2$/g, tap density=0.98 g/$cm^3$) as an active material for negative electrodes, carboxymethyl cellulose (CMC) as a thickener, and styrene butadiene rubber (SBR) as a binder were suspended in water to obtain an active material paste for negative electrodes. Subsequently, the active material paste was applied to a copper foil having a thickness of 10 μm, and dried and pressed. The copper foil was then cut into a sheet to obtain a negative electrode having a basis weight of the active material layer=11.1 mg/$cm^2$, a density of active material in the negative electrode active material=1.0 g/$cm^3$, and a degree of orientation=0.48.

[Preparation of Rechargeable Battery Cells]

The prepared positive electrodes and negative electrodes were alternately laminated with separators placed in between to prepare an electrode assembly, and the electrode assembly was accommodated in a case. Then, the case was filled with electrolytic solution to obtain a rechargeable battery cell. The electrolytic solution had been prepared by mixing ethylene carbonate, methylethyl carbonate, and dimethyl carbonate at a volume ratio of 3:3:4 to obtain a mixed solvent, and dissolving lithium hexafluorophosphate in the mixed solvent such that the concentration of lithium hexafluorophosphate was 1 M.

[Preparation of Rechargeable Battery Modules]

A load applying mechanism was assembled to the obtained single rechargeable battery cell, and a load of 0.25 MPa was applied to the rechargeable battery cell 30 (the electrode assembly 12), so that the rechargeable battery module of Sample 1 was obtained.

Sample 2

The rechargeable battery module of Sample 2 was prepared such that the density of active material in the negative electrode active material layer=1.2 g/$cm^3$, the degree of orientation=0.3, and the load applied by the load applying mechanism=0.25 MPa. Although the rechargeable battery modules of Samples 2 to 5 were different in the density of active material in the negative electrode active material layer, the degree of orientation, and the load applied by the load applying mechanism, the manufacturing procedure was the same as that of the rechargeable battery module of Sample 1. Thus, detailed description will be omitted.

Sample 3

The rechargeable battery module of Sample 3 was prepared such that the density of active material in the negative electrode active material layer=1.5 g/cm$^3$, the degree of orientation=0.07, and the load applied by the load applying mechanism 50=0.25 MPa.

Sample 4

The rechargeable battery module of Sample 4 was prepared such that the density of active material in the negative electrode active material layer=1.2 g/cm$^3$, the degree of orientation=0.3, and the load applied by the load applying mechanism 50=0.1 MPa.

Sample 5

The rechargeable battery module of Sample 5 was prepared such that the density of active material in the negative electrode active material layer=1.2 g/cm$^3$, the degree of orientation=0.3, and the load applied by the load applying mechanism 50=0.22 MPa.

Sample 6

The rechargeable battery module of Sample 6 was a rechargeable battery module of the second embodiment, which includes a plurality of rechargeable battery cells and in which a plate-shaped elastic member was arranged between the rechargeable battery cell at the first end and the first restraint plate, between the rechargeable battery cell at the second end and the second restraint plate, and between each adjacent pair of the rechargeable battery cells. The rechargeable battery module of Sample 6 was prepared such that the density of active material in the negative electrode active material layer=1.5 g/cm$^3$, the degree of orientation=0.07, and the load applied by the load applying mechanism 50=0.25 MPa.

Sample 7

The rechargeable battery module of Sample 7 also had the same configuration as the rechargeable battery module of the second embodiment in which the density of the active material in the negative electrode active material layer=1.2 g/cm$^3$, the degree of orientation=3, and the load applied by the load applying mechanism 50=0.22 MPa.

<Evaluation of Cyclability>

The obtained Samples 1 to 7 were subjected to a predetermined number of charging and discharging cycles. Each of the cycles included a single charging operation and a single discharging operation in a voltage range of 3.48 V to 3.93 V and at a current rate of 1 C. Based on the charge capacity in the first cycle and the charge capacity after the predetermined number of cycles, the capacity maintenance ratio (%) given by the following formula was calculated. The results are shown in Table 1.

Capacity Maintenance Ratio (%)=(Charge capacity after predetermined number of cycles/Charge capacity at first cycle)×100 orientation were 0.3 or lower, and the loads applied by the load applying mechanism were 0.22 MPa or higher. As shown in table 1, Samples 2, 3, 5, 6, and 7 had higher capacity maintenance ratios than those of Samples 1 and 4.

The evaluation results of Sample 1 show that, even when the load applied by the load applying mechanism was 0.25 MPa, the capacity maintenance ratio was lowered when the density was lower than 1.2 g/cm$^3$ and the degree of orientation exceeded 0.3.

Figure 5:
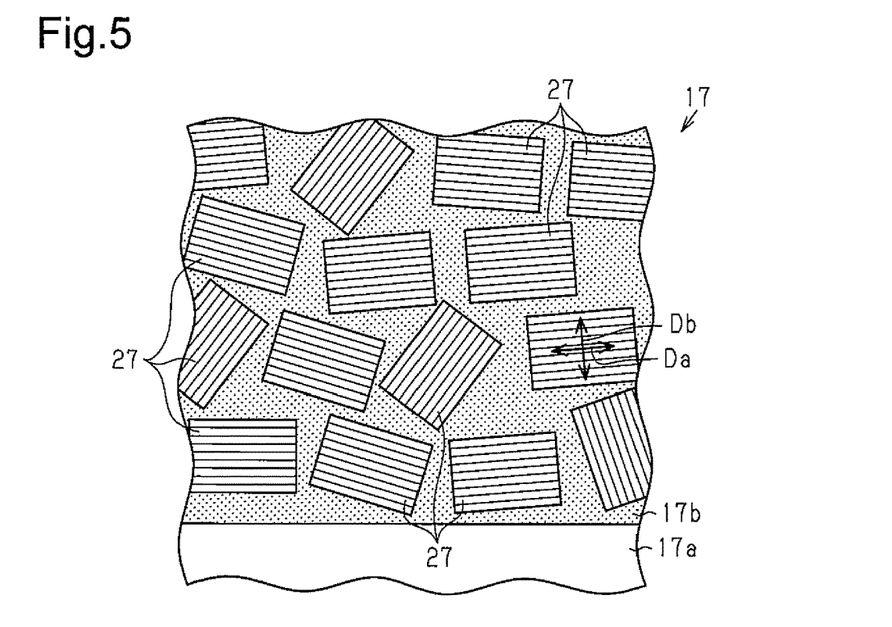
FIG. 5 is an explanatory diagram schematically showing the orientations of active material particles in a negative electrode active material layer.

This is believed to have been caused by the fact that, as shown in FIG. 5, the active material particles in the negative electrode active material layer were not sufficiently oriented to align the interlayer directions Db in the crystal structure with the lamination directions D2, and the interlayer peeling could not be sufficiently restrained by the load applied by the load applying mechanism. As a result, the capacity maintenance ratio was low.

The evaluation results of Sample 4 show that, when the load applied by the load applying mechanism was 0.1 MPa (smaller than 0.20 MPa), the capacity maintenance ratio was lowered even if the density was 1.2 g/cm$^3$ or higher and the degree of orientation was 0.3 or lower. In addition, as compared with Sample 5, in which the load applied by the load applying mechanism was 0.22 MPa, Samples 2 and 3 having a load of 0.25 MPa had higher capacity maintenance ratios.

Samples 6 and 7 each had a load applying mechanism in which an elastic member was arranged between a rechargeable battery cell and the first restraint plate, between a rechargeable battery cell and the second restraint plate, and between each adjacent pair of the rechargeable battery cells. The evaluation results of Samples 6 and 7 show that Samples 6 and 7 had high capacity maintenance ratios as compared with those of Samples 3 and 5, which did not use elastic members.

Figure 8:
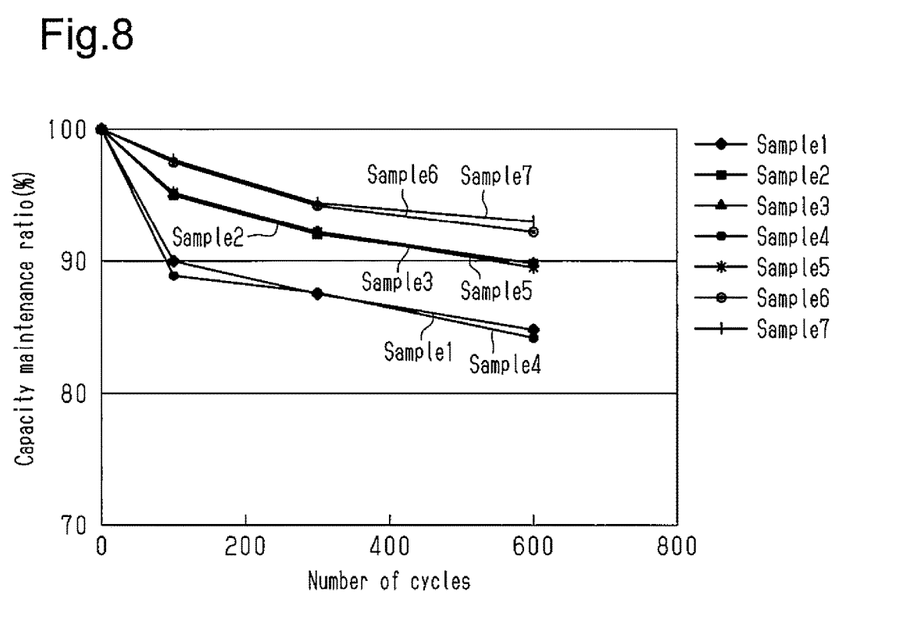
FIG. 8 is a graph representing the relationship between the number of cycles and the capacity maintenance ratio.

FIG. 8 shows the relationships between the number of cycles and the capacity maintenance ratios of Samples 1 to 7. FIG. 8 clearly shows that Samples 2, 3, 5 had capacity maintenance ratios higher than those of Samples 1, 4, and that Samples 6, 7 had capacity maintenance ratios even higher than those of Samples 2, 3, 5.

<Evaluation of Misalignment of Active Material Particles>

Samples 1 to 7 were subjected to a predetermined number of times of, that is, 600 times of discharging and charging cycles. Samples 1 to 7 were disassembled after discharging, the negative electrodes were taken out, washed with dimethyl carbonate and dried, and the thicknesses of the negative electrodes were measured. The results of the measurements show that misalignment of the active material

TABLE 1

| Number of cycles | Capacity maintenance ratio (%) | | | | | | |
|---|---|---|---|---|---|---|---|
| | Sample 1 | Sample 2 | Sample 3 | Sample 4 | Sample 5 | Sample 6 | Sample 7 |
| 0 | 100 | 100 | 100 | 100 | 100 | 100 | 100 |
| 100 | 90.0 | 95.0 | 95.1 | 88.9 | 95.2 | 97.5 | 97.7 |
| 300 | 87.5 | 92.0 | 92.2 | 87.6 | 92.2 | 94.2 | 94.4 |
| 600 | 84.8 | 89.8 | 89.8 | 84.2 | 89.5 | 92.2 | 93 |

In Samples 2, 3, 5, 6, 7, the densities of active material (carbon-based material) in the negative electrode active material layers were 1.2 g/cm$^3$ or higher, the degrees of particles occurred in samples in which the film thickness of the negative electrode was increased. The results are shown in Table 2.

TABLE 2

| | Sample 1 | Sample 2 | Sample 3 | Sample 4 | Sample 5 | Sample 6 | Sample 7 |
|---|---|---|---|---|---|---|---|
| Elastic member | Not provided | Not provided | Not provided | Not provided | Not provided | Provided | Provided |
| Density (g/cm$^3$) | 1.0 | 1.2 | 1.5 | 1.2 | 1.2 | 1.5 | 1.2 |
| Degree of orientation | 0.48 | 0.30 | 0.07 | 0.30 | 0.30 | 0.07 | 0.30 |
| Restraining load (MPa) | 0.25 | 0.25 | 0.25 | 0.10 | 0.22 | 0.25 | 0.22 |
| Increase of Negative Electrode Film Pressure (MPa) | 8 | 0 | 0 | 10 | 0 | 0 | 0 |
| Misalignment in Negative Electrode | Occurred | Not occurred | Not occurred | Occurred | Not occurred | Not occurred | Not occurred |

As shown in Table 2, in Samples 1 and 4, which had low capacity maintenance ratios, misalignment of active material particles occurred. In contrast, in samples 2, 3, 5, 6, and 7, which had high capacity maintenance ratios, misalignment of active materials did not occur. According to the measurement results, it is preferable that the density of the active material in the negative electrode active material layer be 1.2 g/cm$^3$ or higher, the degree of orientation be 0.3 or lower, and the load applied by the load applying mechanism be 0.22 MPa or greater.

DESCRIPTION OF THE REFERENCE NUMERALS

D2 . . . Lamination Direction, Da . . . In-layer Direction, Db . . . Interlayer Direction, 10 . . . Rechargeable Battery Module (Electricity Storage Device), 11 . . . Case, 12 . . . Electrode Assembly, 16 . . . Positive Electrode, 17 . . . Negative Electrode, 17a . . . Negative Electrode Metal Foil (Metal Foil), 17b . . . Negative Electrode Active Material Layer, 18 . . . Separators, 27 . . . Active Material Particles, (Carbon-based Material), 30 . . . Rechargeable Battery Cells (Unit Electricity Storage Portions), 50 . . . Load Applying Mechanism, 51 . . . First Restraint Plate, 51a . . . Load Application Surface, 52 . . . Second Restraint Plate, 52a . . . Load Application Surface, 60 . . . Elastic Members, 70 . . . Thickness Adjusters

The invention claimed is:

1. An electricity storage device comprising:
   one or more unit electricity storage portions, the one or more unit electricity storage portions including an electrode assembly in which a positive electrode and a negative electrode are stacked and layered while being insulated from each other and a case configured to accommodate the electrode assembly; and
   a load applying mechanism that applies, to the electrode assembly, a load in a lamination direction in which the positive electrode and the negative electrode are stacked in the electrode assembly, wherein
   the load applying mechanism includes:
      a pair of restraint plates, which respectively contact opposite ends of a single unit electricity storage portion in the lamination direction or which respectively contact a first electricity storage portion arranged at a first end of a plurality of unit electricity storage portions in the lamination direction and a second electricity storage portion arranged at a second end of the plurality of unit electricity storage portions in the lamination direction,
      four bolts, which are respectively inserted through four corners of the pair of restraint plates, and
      four nuts, which are threaded to the respective bolts, wherein
   the negative electrode includes
      a metal foil, and
      an active material layer that covers at least part of the metal foil and contains a carbon-based material as an active material,
   a density of the carbon-based material in the active material layer is 1.2 g/cm$^3$ or higher,
   a degree of orientation that is defined as a ratio (I(100)/I(002)) of an X-ray diffraction intensity I(100) of a (100) plane to a diffraction intensity I(002) of a (002) plane in the active material layer is lower than or equal to 0.3, and
   the load applied by the load applying mechanism is greater than or equal to 0.2 MPa.

2. The electricity storage device according to claim 1, wherein the load applied by the load applying mechanism is greater than or equal to 0.22 MPa.

3. The electricity storage device according to claim 1, wherein
   the electrode assembly has a lamination structure in which the positive electrode and the negative electrode are alternately laminated, and
   the load applying mechanism includes a load application surface at which the load applying mechanism applies the load to the electrode assembly.

4. The electricity storage device according to claim 1, wherein
   the electrode assembly includes a porous separator that is arranged between the positive electrode and the negative electrode and insulates the positive electrode and the negative electrode from each other, and
   the load applied by the load applying mechanism is smaller than or equal to 4 MPa.

5. The electricity storage device according to claim 1 wherein the load applying mechanism is configured to apply the load from outside the case.

6. The electricity storage device according to claim 5, wherein
   a plate-shaped elastic member is arranged at least at one of a position between one of the plurality of unit electricity storage portions and one of the restraint plates and a position between an adjacent pair of the plurality of unit electricity storage portions.

7. The electricity storage device according to claim 1, wherein the load applying mechanism is a thickness adjuster provided in the case of a unit electricity storage portion, and the thickness adjuster is arranged between the electrode assembly and a wall of the case in the direction in which the positive electrode and the negative electrode of the case are stacked.

8. The electricity storage device according to claim 1, wherein the carbon-based material is graphite.

9. The electricity storage device according to claim 1, wherein the load applied by the load applying mechanism is smaller than or equal to 0.25 MPa.

* * * * *